United States Patent
Yang

(10) Patent No.: US 8,665,287 B2
(45) Date of Patent: Mar. 4, 2014

(54) COLOR INFORMATION INTERPOLATION METHOD

(75) Inventor: Chih-Yuan Yang, Hsinchu County (TW)

(73) Assignee: NOVATEK Microelectronics Corp., Hsinchu Science Park, Hsin-Chu (TW)

( * ) Notice: Subject to any disclaimer, the term of this patent is extended or adjusted under 35 U.S.C. 154(b) by 164 days.

(21) Appl. No.: 13/283,616

(22) Filed: Oct. 28, 2011

(65) Prior Publication Data
US 2013/0050235 A1    Feb. 28, 2013

(30) Foreign Application Priority Data

Aug. 22, 2011    (TW) .............................. 100130016 A

(51) Int. Cl.
*G09G 5/02*    (2006.01)
(52) U.S. Cl.
USPC ............................ 345/589; 348/273; 348/272
(58) Field of Classification Search
None
See application file for complete search history.

(56) References Cited

U.S. PATENT DOCUMENTS

| 5,629,734 A | * | 5/1997 | Hamilton et al. ........... 348/222.1 |
| 2005/0200733 A1 | * | 9/2005 | Malvar .......................... 348/272 |
| 2009/0128662 A1 | * | 5/2009 | Moon et al. ............... 348/231.99 |
| 2010/0104214 A1 | * | 4/2010 | Tamburrino et al. .......... 382/276 |
| 2010/0165157 A1 | * | 7/2010 | Hyun et al. .................... 348/273 |
| 2011/0032396 A1 | * | 2/2011 | Park et al. ..................... 348/273 |

* cited by examiner

*Primary Examiner* — Xiao M. Wu
*Assistant Examiner* — Yu Chen
(74) *Attorney, Agent, or Firm* — Winston Hsu; Scott Margo

(57) ABSTRACT

A color information interpolation method is disclosed. The color information interpolation method comprises steps of receiving a luminance information corresponding to a pixel matrix, wherein the luminance information is arranged in a Bayer pattern and records a specific color information of each pixel of the pixel matrix, and the specific color information is one of a red color information, a green color information and a blue color information, calculating a horizontal variance and a vertical variance of a pixel according to the luminance information, and interpolating the pixel of the luminance information with one of a horizontal color estimate, a vertical color estimate and a directionless color estimate according to the horizontal variance and the vertical variance, to derive color information of the pixel other than the specific color information.

8 Claims, 8 Drawing Sheets

| R11 | G12 | R13 | G14 | R15 |
| G21 | B22 | G23 | B24 | G25 |
| R31 | G32 | R33 | G34 | R35 |
| G41 | B42 | G43 | B44 | G45 |
| R51 | G52 | R53 | G54 | R55 |

COLOR INFORMATION INTERPOLATION METHOD

BACKGROUND OF THE INVENTION

1. Field of the Invention

The present invention relates to a color information interpolation method, and more particularly, to a color information interpolation method capable of utilizing image contrast adjustment, detail variance and chromatic mean variance for determination, to enhance determination of an image detail direction.

2. Description of the Prior Art

Generally speaking, for reducing the cost, when a pixel matrix of consumer image detector detects images to generate luminance information, the luminance information is arranged in a Bayer pattern and only records a specific color information of each pixel of the pixel matrix, and the specific color information is one of a red color information, a green color information and a blue color information. Therefore, when an image processor receives the luminance information, the image processor needs to reestablish missed color information via the interpolation method, to have three color information of each pixel.

In the prior art, the interpolation method mainly utilizes one of the bilinear interpolation, the boundary interpolation and the minimum chromatic decision interpolation. For the bilinear interpolation, the missed color information is interpolated with neighboring pixels, but the main drawbacks are blurred images, serious false color phenomenon, and likely wrong determination in edges; for the boundary interpolation, the missed color information is interpolated via direction determination, i.e. interpolated with horizontal-direction pixels or vertical-direction pixels, but the main drawback is a low accuracy of the direction determination in boundaries with subtle changes. For example, a direction of a high frequency image area may be wrongly determined, and appears lattices in the image (e.g. a vertical direction is determined as a horizontal direction); and for the minimum chromatic decision interpolation, the missed color information is interpolated via a minimum chromatic difference of the near pixels, but the main drawback is a low accuracy of the direction determination in the high frequency image area.

As can be seen from the above, the conventional interpolation method only utilizes one of the bilinear interpolation, the boundary interpolation and the minimum chromatic decision interpolation, causing blurred image and low accuracy of the determination in the high frequency image area. Thus, there is a need to improve over the prior art.

SUMMARY OF THE INVENTION

It is therefore an objective of the present invention to provide a color information interpolation method capable of utilizing image contrast adjustment, detail variance and chromatic mean variance for determination, to enhance determination of an image detail direction.

The present invention discloses a color information interpolation method. The color information interpolation method includes steps of receiving a luminance information corresponding to a pixel matrix, wherein the luminance information is arranged in a Bayer pattern and records a specific color information of each pixel of the pixel matrix, and the specific color information is one of a red color information, a green color information and a blue color information, calculating a horizontal variance and a vertical variance of a pixel according to the luminance information, and interpolating the pixel of the luminance information with one of a horizontal color estimate, a vertical color estimate and a directionless color estimate according to the horizontal variance and the vertical variance, to derive color information of the pixel other than the specific color information.

These and other objectives of the present invention will no doubt become obvious to those of ordinary skill in the art after reading the following detailed description of the preferred embodiment that is illustrated in the various figures and drawings.

DETAILED DESCRIPTION

Figure 1A:
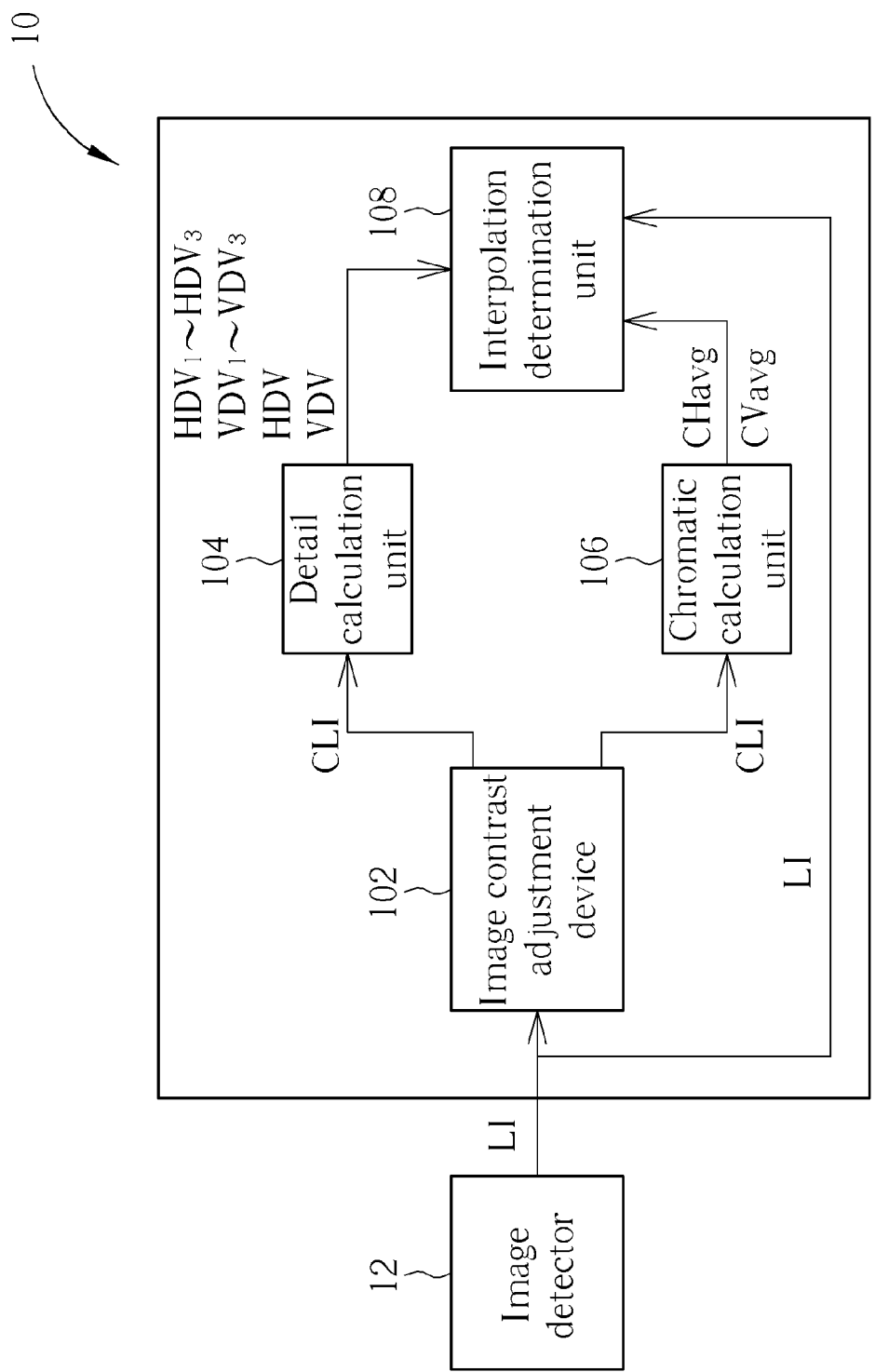
FIG. 1A is a schematic diagram of an image processor according to an embodiment of the present invention.
Figure 1B:
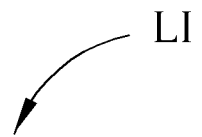
FIG. 1B is a schematic diagram of a luminance information when a pixel matrix shown in FIG. 1A is 5 by 5.

Please refer to FIG. 1A, which is a schematic diagram of an image processor 10 according to an embodiment of the present invention. The image processor 10 is mainly utilized in an image capture device, such as a digital camera, an internet protocol camera, an external camera and a built-in camera of a computer, etc. The image processor 10 includes an image contrast adjustment device 102, a detail calculation unit 104, a chromatic calculation unit 106 and an interpolation determination unit 108. In short, the image processor 10 receives a luminance information LI corresponding to a pixel matrix PM from an image detector 12. The luminance information LI is arranged in a Bayer pattern and records a specific color information PCI of each pixel of the pixel matrix PM, and the specific color information PCI is one of a red color information, a green color information and a blue color information. For example, FIG. 1B is a schematic diagram of the luminance information LI when the pixel matrix PM is 5 by 5, wherein pixels R denote pixels having the specific color information PCI as the red color information, pixels G denotes pixels having the specific color information PCI as the green color information, pixels B denote pixels having the specific color information PCI as the blue color information. The detail calculation unit 104 calculates a horizontal detail variance HDV and a vertical detail variance VDV of a pixel PX according to the luminance information LI, and the interpolation determination unit 108 performs interpolation on the pixel PX of the luminance information LI via one of a horizontal color information estimate Eh, a vertical color information estimate Ev and a directionless color information estimate En according to the horizontal detail variance HDV and the vertical detail variance VDV, to derive color information of the pixel PX other than the specific color information PCI.

In such a situation, when the horizontal detail variance HDV minus the vertical detail variance VDV of the pixel PX is greater than a detail threshold DT, the interpolation determination unit 108 performs interpolation on the pixel PX of the luminance information LI with the vertical color information estimate Ev, i.e. when determining horizontal-direction pixels of the pixel PX have a greater detail variation, the interpolation determination unit 108 performs interpolation on the pixel PX with the specific color information PCI of vertical-direction pixels of the pixel PX; when the vertical detail variance VDV minus the horizontal detail variance HDV of the pixel PX is greater than the detail threshold DT, the interpolation determination unit 108 performs interpolation on the pixel PX of the luminance information LI with the horizontal color information estimate Eh, i.e. when determining vertical-direction pixels of the pixel PX has a greater detail variation, the interpolation determination unit 108 performs interpolation on the pixel PX with the specific color information PCI of horizontal-direction pixels of the pixel PX.

On the other hand, when both the horizontal detail variance HDV minus the vertical detail variance VDV and the vertical detail variance VDV minus the horizontal detail variance HDV of the pixel PX are smaller than the detail threshold DT, the chromatic calculation unit 106 calculates a horizontal chromatic average variance CHavg and a vertical chromatic average variance CVavg of the pixel according to the luminance information LI, such that the interpolation determination unit 108 interpolates the pixel PX of the luminance information LI with one of the horizontal color information estimate Eh, the vertical color information estimate Ev and the directionless color information estimate En according to the horizontal chromatic average variance CHavg and the vertical chromatic average variance CVavg, to derive color information of the pixel PX other than the specific color information PCI.

In detail, when the horizontal chromatic average variance CHavg minus the vertical chromatic average variance CVavg of the pixel PX is greater than a chromatic threshold CT, the interpolation determination unit 108 performs interpolation on the pixel PX of the luminance information LI with the vertical color information estimate Ev, i.e. when determining horizontal-direction pixels of the pixel PX have a greater chromatic variation, the interpolation determination unit 108 performs interpolation on the specific color information PCI with the vertical-direction pixels around the pixel PX; when the vertical chromatic average variance CVavg minus the horizontal chromatic average variance CHavg of the pixel PX is greater than the chromatic threshold CT, the interpolation determination unit 108 performs interpolation of the pixel PX of the luminance information LI with the horizontal color information estimate Eh, i.e. when determining vertical-direction pixels of the pixel PX have a greater chromatic variation, the interpolation determination unit 108 performs interpolation on the specific color information PCI with the horizontal-direction pixels around the pixel PX; and when both the horizontal chromatic average variance CHavg minus the vertical chromatic average variance CVavg and the vertical chromatic average variance CVavg minus the horizontal chromatic average variance CHavg of the pixel PX are smaller than the chromatic threshold CT, i.e. on the flat area of the image, the interpolation determination unit 108 performs interpolation on the pixel PX of the luminance information LI with the directionless color information estimate En, i.e. when determining no pixels in a specific direction of the pixel PX have a greater chromatic variation, the interpolation determination unit 108 performs interpolation on the pixel PX with the specific color information PCI of all pixels around the pixel PX. As a result, the image processor 10 can perform determination according to detail variances HDV and VDV, and chromatic average variances CHavg and CVavg, and then perform interpolation with a proper color information estimate, to enhance determination of an image detail direction.

Figure 2:
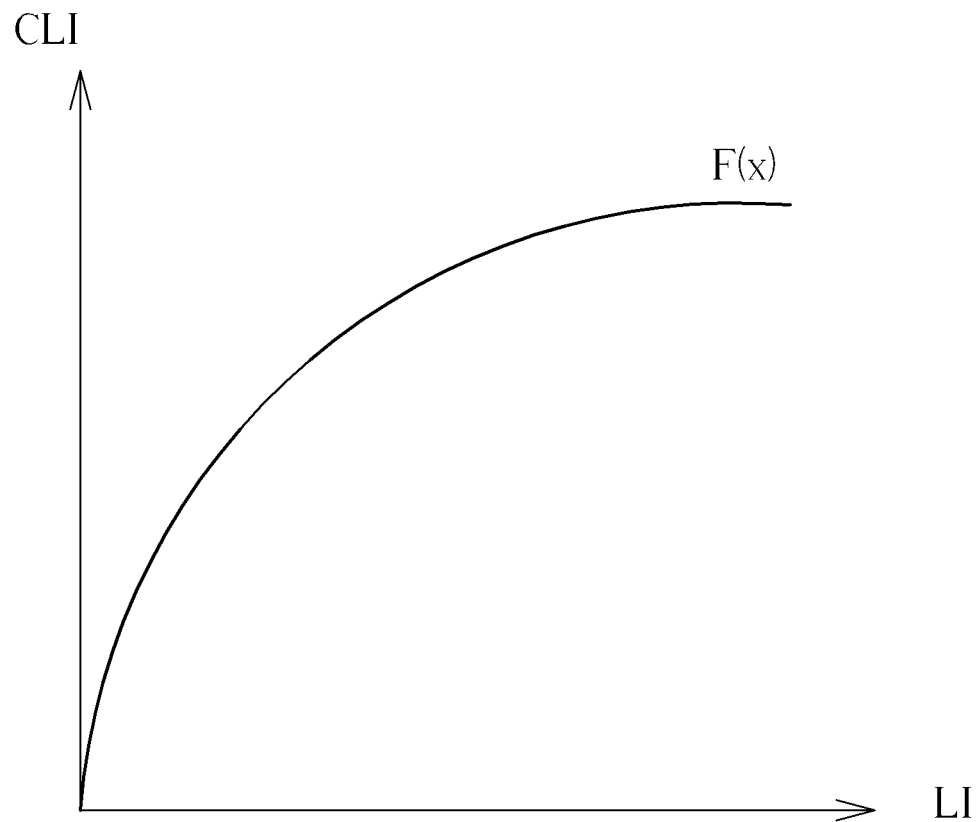
FIG. 2 is a schematic diagram of a function for an image contrast adjustment device shown in FIG. 1 to perform image contrast adjustment.

In addition, please refer to FIG. 2, which is a schematic diagram of a function F(x) for the image contrast adjustment device 102 shown in FIG. 1 to perform image contrast adjustment. As shown in FIG. 2, the image processor 10 further including the image contrast adjustment device 102, for performing image contrast adjustment on the luminance information LI according to the function F(x) after the image processor 10 receives the luminance information LI, to increase contrast between pixels having middle illumination and pixels having low illumination of the pixel matrix PX, so as to generate a contrast luminance information CLI for the detail calculation unit 104 and the chromatic calculation unit 106. The detail calculation unit 104 and the chromatic calculation unit 106 calculate the horizontal detail variance HDV and the vertical detail variance VDV, and the horizontal chromatic average variance CHavg and the vertical chromatic average variance CVavg, respectively, to enhance determination of the image detail direction. Noticeably, the interpolation determination unit 108 still performs interpolation on the pixel of the original luminance information LI rather than the pixel of the contrast luminance information CLI, to reestablish color information. Therefore, pixels of the image can retain original information, and the edge detail is not affected. As a result, the image contrast adjustment device 102 can increase the contrast between the pixels having middle illumination and the pixels having low illumination, to enhance determination of the image detail direction of the pixels having middle illumination and the pixels having low illumination.

Figure 3A:
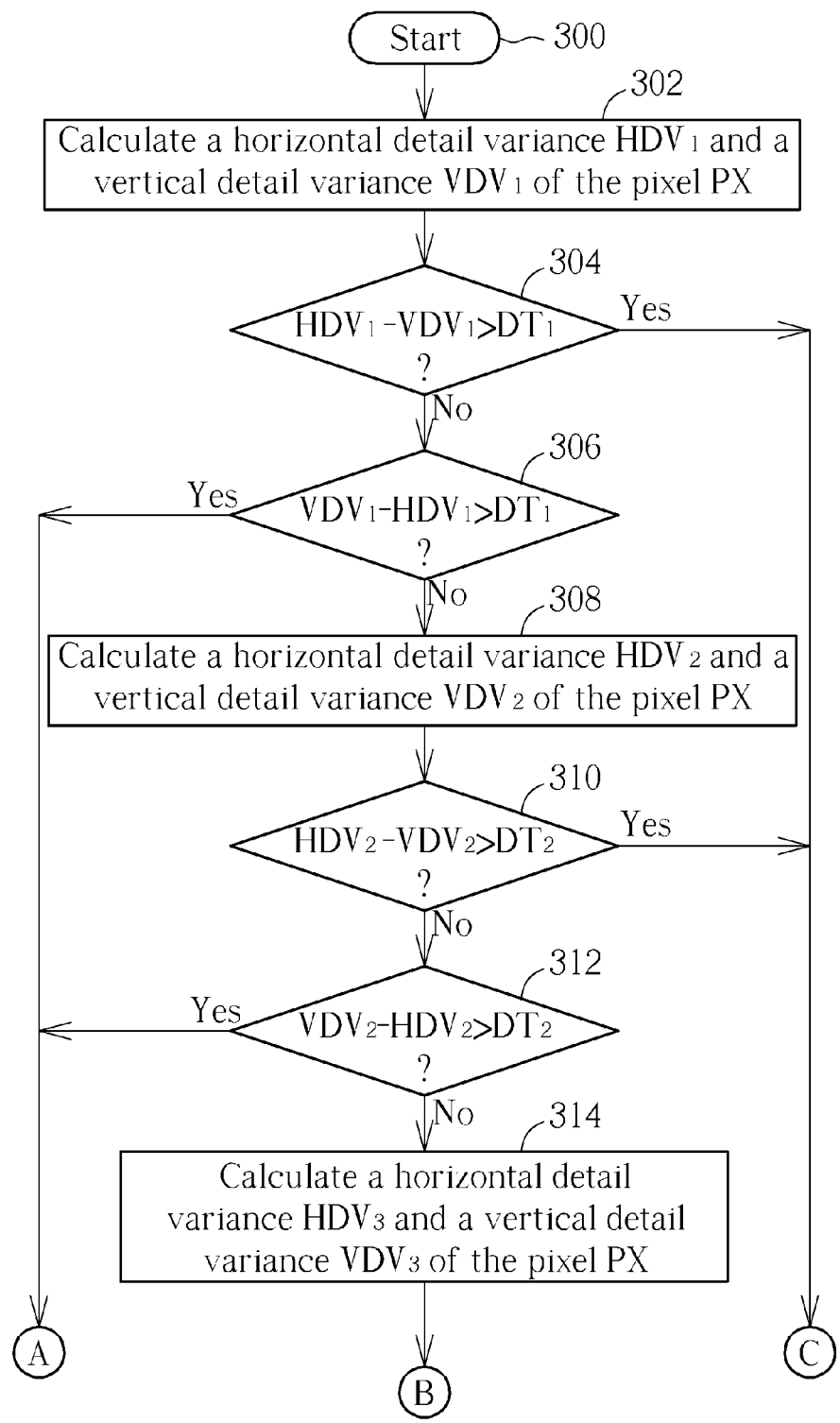
FIG. 3A and FIG. 3B are schematic diagrams of a color information interpolation process according to an embodiment of the present invention.
Figure 3B:
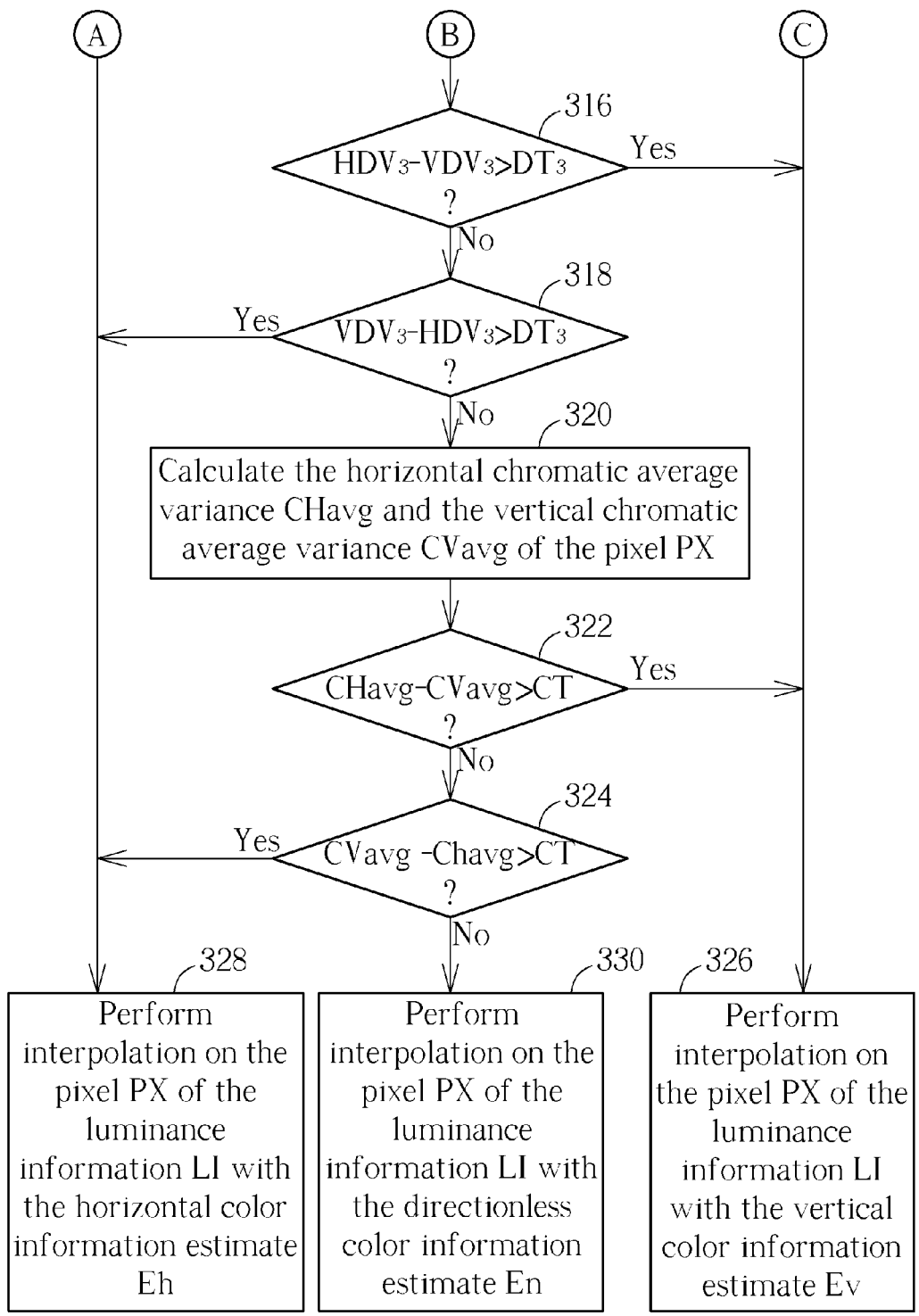

Specifically, operations of the image processor 10 can be a color information interpolation process 30 in an embodiment, as shown in FIG. 3A and FIG. 3B. The color information interpolation process 30 includes following steps:

Step 300: Start.

Step 302: Calculate a horizontal detail variance $HDV_1$ and a vertical detail variance $VDV_1$ of the pixel PX according to the pixel PX and all pixels around the pixel PX of the luminance information LI.

Step 304: Determine whether the horizontal detail variance $HDV_1$ minus the vertical detail variance $VDV_1$ is greater than a detail threshold $DT_1$. If yes, go to Step 326; otherwise, go to Step 306.

Step 306: Determine whether the vertical detail variance $VDV_1$ minus the horizontal detail variance $HDV_1$ is greater than the detail threshold $DT_1$. If yes, go to Step 328; otherwise, go to Step 308.

Step 308: Calculate a horizontal detail variance $HDV_2$ and a vertical detail variance $VDV_2$ of the pixel PX according to the pixel PX and pixels around the pixel PX of the luminance information LI which have a same color information as a desired interpolation color information.

Step 310: Determine whether the horizontal detail variance $HDV_2$ minus the vertical detail variance $VDV_2$ is greater than a detail threshold $DT_2$. If yes, go to Step 326; otherwise, go to Step 312.

Step 312: Determine whether the vertical detail variance $VDV_2$ minus the horizontal detail variance $HDV_2$ is greater than the detail threshold $DT_2$. If yes, go to Step 328; otherwise, go to Step 314.

Step 314: Calculate a horizontal detail variance $HDV_3$ and a vertical detail variance $VDV_3$ of the pixel PX according to the pixel PX and pixels around the pixel PX of the luminance information LI which have different color information with the desired interpolation color information.

Step 316: Determine whether the horizontal detail variance $HDV_3$ minus the vertical detail variance $VDV_3$ is greater than a detail threshold $DT_3$. If yes, go to Step 326; otherwise, go to Step 318.

Step 318: Determine whether the vertical detail variance $VDV_3$ minus the horizontal detail variance $HDV_3$ is greater than the detail threshold $DT_3$. If yes, go to Step 328; otherwise, go to Step 320.

Step 320: Calculate the horizontal chromatic average variance CHavg and the vertical chromatic average variance CVavg of the pixel PX according to the pixel PX and pixels in the vertical-direction and pixels in the horizontal-direction of the pixel PX of the luminance information LI.

Step 322: Determine whether the horizontal chromatic average variance CHavg minus the vertical chromatic average variance CVavg is greater than the chromatic threshold CT. If yes, go to Step 326; otherwise, go to Step 318.

Step 324: Determine whether the vertical chromatic average variance CVavg minus the horizontal chromatic average variance CHavg is greater than the chromatic threshold CT. If yes, go to Step 328; otherwise, go to Step 330.

Step 326: Perform interpolation on the pixel PX of the luminance information LI with the vertical color information estimate Ev.

Step 328: Perform interpolation on the pixel PX of the luminance information LI with the horizontal color information estimate Eh.

Step 330: Perform interpolation on the pixel PX of the luminance information LI with the directionless color information estimate En.

As can be seen from the color information interpolation process 30, when determining whether the horizontal variance or the vertical variance is apparently greater than the other, to decide to utilize which one of the vertical color information estimate Ev, the horizontal color information estimate Eh and the directionless color information estimate En for interpolation, the present invention calculates the detail variances $HDV_1$~$HDV_3$, $VDV_1$~$VDV_3$ from rough to detail through three stages, to determine whether the horizontal variance or the vertical variance is apparently greater than the other, if all the detail variances $HDV_1$~$HDV_3$, $VDV_1$~$VDV_3$ can not be utilized for affirmative determination, the present invention utilizes the chromatic average variance CHavg and CVavg for determination.

Figure 4:
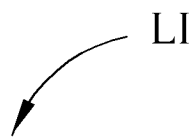
FIG. 4 is a schematic diagram of a detail calculation unit shown in FIG. 1 calculating horizontal detail variances and vertical detail variances.

For example, please refer to FIG. 4, which is a schematic diagram of the detail calculation unit 104 shown in FIG. 1 calculating the horizontal detail variances $HDV_1$~$HDV_3$ and the vertical detail variances $VDV_1$~$VDV_3$. According to the color information interpolation process 30, when intending to reestablish a missed green color information G33 of the pixel R33 having a specific color information PCI33 as a red color information, the detail calculation unit 104 calculates the horizontal detail variance $HDV_1$ and the vertical detail variance $VDV_1$ of the pixel R33 according to the pixel R33 and all pixels around the pixel R33 of the luminance information LI as follows:

$$HDV_1 = k1*|G32-G34|+k2*|\alpha*R33-R31-R35|+ \\ (k3*|B22-B24|+k4*|\beta*G23-G21-G25|)/k5+ \\ (k6*|B42-B44|+k7*|\gamma*G43-G41-G45|)/k8$$

$$VDV_1 = k1*|G23-G43|+k2*|\alpha*R33-R13-R53|+ \\ (k3*|B22-B42|+k4*|\beta*G32-G12-G52|)/k5+ \\ (k6*|B24-B44|+k7*|\gamma*G34-G14-G54|)/k8$$

wherein k1, k2, k3, k4, k5, k6, k7, k8 and $\alpha$, $\beta$, $\gamma$ are predefined parameters, $HDV_1$ is a first detail variance in the horizontal-direction and $VDV_1$ is a first detail variance in the vertical-direction.

As can be seen from the above, the horizontal detail variance $HDV_1$ is obtained by setting the pixel R33 as a center and calculating a variance of pixels G32 and G34, and a variance of pixels R33, R31 and R35, etc., and giving different weights according to space positions of the horizontal-direction pixels relative to the center pixel R33, wherein all the other neighboring horizontal pixels G21, B22, G23, B24, G25 and G41, B42, G43, B44, G45 can be calculated similar to the above method to obtain horizontal detail variances. Finally, the horizontal detail variance $HDV_1$ can be obtained by summing all the horizontal detail variances of the different positions with different weightings. By the same token, the vertical detail variance $VDV_1$ can be obtained by summing all the vertical detail variances of the different positions with different weightings.

Then, if determining the horizontal detail variance $HDV_1$ minus the vertical detail variance $VDV_1$ is greater than the detail threshold $DT_1$, the interpolation determination unit 108 performs interpolation on the pixel R33 of the luminance information LI with the vertical color information estimate Ev, to reestablish the green color information G33; if determining the vertical detail variance $VDV_1$ minus the horizontal detail variance $HDV_1$ is greater than the detail threshold $DT_1$, the interpolation determination unit 108 performs interpolation on the pixel R33 of the luminance information LI with the horizontal color information estimate Eh, to reestablish the green color information G33. Finally, if determining both the vertical detail variance $VDV_1$ minus the horizontal detail variance $HDV_1$ and the horizontal detail variance $HDV_1$ minus the vertical detail variance $VDV_1$ are smaller than the detail threshold $DT_1$, the detail calculation unit 104 calculates the horizontal detail variance $HDV_2$ and the vertical detail variance $VDV_2$ of the pixel R33 according to the pixel R33 and pixels around the pixel R33 of the luminance information LI which have the same color information (green) with the desired interpolation color information G33 as follows:

$$HDV_2 = g1*|G12-G14|+g2*|G21-G23|+g3*|G23-\\G25|+g4*|G32-G34|+g5*|G41-G43|+|G45-\\G43|+g6*|G52-G54|$$

$$VDV_2 = g1*|G21-G41|+g2*|G12-G32|+g3*|G32-\\G52|+g4*|G23-G43|+g5*|G14-G34|+|G54-\\G34|+g6*|G25-G45|$$

wherein g1, g2, g3, g4, g5, g6 are predefined parameters, $HDV_2$ is a second detail variance in the horizontal-direction and $VDV_2$ is a second detail variance in the vertical-direction.

As can be seen from the above, the horizontal detail variance $HDV_2$ is obtained by setting the pixel R33 as a center and calculating the variances of neighboring horizontal green pixels, e.g. a variance of pixels G32 and G34, a variance of pixels G21 and G23, and a variance of pixels G23 and G25, etc., and giving different weights according to space positions of the horizontal-direction pixels relative to the center pixel R33, wherein all the other neighboring horizontal pixels can be calculated similar to the above method to obtain horizontal detail variances. Finally, the horizontal detail variance $HDV_2$ can be obtained by summing all the horizontal detail variances of the different positions with different weightings. By the same token, the vertical detail variance $VDV_2$ can be obtained by summing all the vertical detail variances of the different positions with different weightings.

Then, if determining the horizontal detail variance $HDV_2$ minus the vertical detail variance $VDV_2$ is greater than the detail threshold $DT_2$, the interpolation determination unit 108 performs interpolation on the pixel R33 of the luminance information LI with the vertical color information estimate Ev, to reestablish the green color information G33; if determining the vertical detail variance $VDV_2$ minus the horizontal detail variance $HDV_2$ is greater than the detail threshold $DT_2$, the interpolation determination unit 108 performs interpolation on the pixel R33 of the luminance information LI with the horizontal color information estimate Eh, to reestablish the green color information G33. Finally, if determining both the vertical detail variance $VDV_2$ minus the horizontal detail variance $HDV_2$ and the horizontal detail variance $HDV_2$ minus the vertical detail variance $VDV_2$ are smaller than the detail threshold $DT_2$, the detail calculation unit 104 calculates the horizontal detail variance $HDV_3$ and the vertical detail variance $VDV_3$ of the pixel R33 according to the pixel R33 and pixels around the pixel R33 of the luminance information LI which have different color information (red and blue) with the desired interpolation color information G33 as follows:

$$HDV3=r1*|B22-B24|+r2*|B42-B44|+r3*|R31-R33|+r4*|R35-R33|$$

$$VDV3=r1*|B22-B42|+r2*|B24-B44|+r3*|R13-R33|+r4*|R53-R33|$$

wherein r1, r2, r3, r4 are predefined parameters, $HDV_3$ is a third detail variance in the horizontal-direction and $VDV_3$ is a third detail variance in the vertical-direction.

As can be seen from the above, the horizontal detail variance $HDV_3$ is obtained by setting the pixel R33 as a center and calculating the variances of neighboring horizontal blue pixels and neighboring horizontal red pixels, e.g. a variance of pixels R31 and R33, a variance of pixels R33 and R35, and a variance of pixels B22 and B24, etc., and giving different weights according to space positions of the horizontal-direction pixels relative to the center pixel R33, wherein all the other neighboring horizontal pixels can be calculated similar to the above method to obtain horizontal detail variances. Finally, the horizontal detail variance $HDV_3$ can be obtained by summing all the horizontal detail variances of the different positions with different weightings. By the same token, the vertical detail variance $VDV_3$ can be obtained by summing all the vertical detail variances of the different positions with different weightings.

Then, if determining the horizontal detail variance $HDV_3$ minus the vertical detail variance $VDV_3$ is greater than the detail threshold $DT_3$, the interpolation determination unit 108 performs interpolation on the pixel R33 of the luminance information LI with the vertical color information estimate Ev, to reestablish the green color information G33; if determining the vertical detail variance $VDV_3$ minus the horizontal detail variance $HDV_3$ is greater than the detail threshold $DT_3$, the interpolation determination unit 108 performs interpolation on the pixel R33 of the luminance information LI with the horizontal color information estimate Eh, to reestablish the green color information G33.

Figure 5:
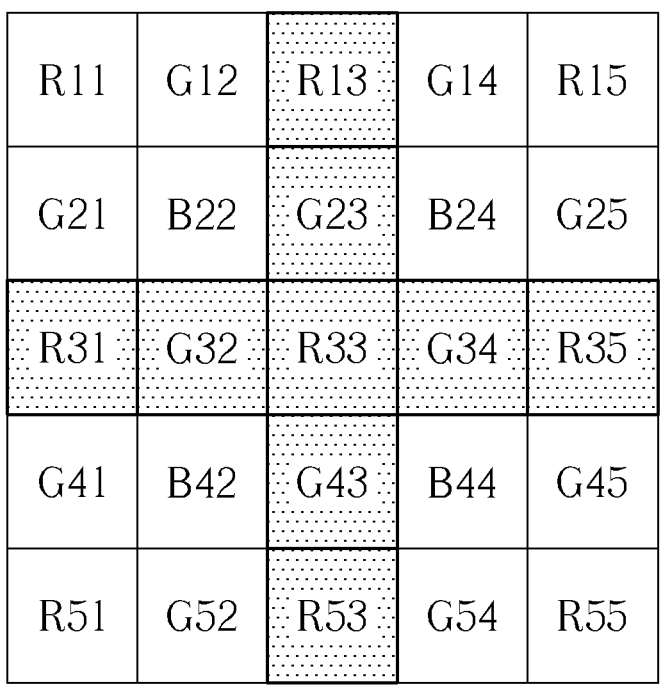
FIG. 5 is a schematic diagram of a chromatic calculation unit shown in FIG. 1 calculating a horizontal chromatic average variance and a vertical chromatic average variance.

Finally, please refer to FIG. 5, which is a schematic diagram of the chromatic calculation unit 106 shown in FIG. 1 calculating the horizontal chromatic average variance CHavg and the vertical chromatic average variance CVavg. If determining both the vertical detail variance $VDV_3$ minus the horizontal detail variance $HDV_3$ and the horizontal detail variance $HDV_3$ minus the vertical detail variance $VDV_3$ are smaller than the detail threshold $DT_3$, the chromatic calculation unit 106 calculates the horizontal chromatic average variance CHavg and the vertical chromatic average variance CVavg of the pixel R33 according to the pixel R33 and pixels in the vertical-direction and pixels in the horizontal-direction (e.g. dotted pixels shown in FIG. 5) of the pixel R33 of the luminance information LI as follows:

$$CH1=|G32-R33|$$

$$CH2=|G32-R31|$$

$$CH3=|G34-R33|$$

$$CH4=|G34-R35|$$

$$CV1=|G23-R33|$$

$$CV2=|G23-R13|$$

$$CV3=|G43-R33|$$

$$CV4=|G43-R53|$$

$$CHavg=(v1*CH1+v2*CH2+v3*CH3+v4*CH4)/v5$$

$$CVavg=(v1*CV1+v2*CV2+v3*CV3+v4*CV4)/v5$$

wherein CH1, CH2, CH3, CH4 are respective horizontal-direction chromatic variances of neighboring pixels, CV1, CV2, CV3, CV4 are respective vertical-direction chromatic variances of neighboring pixels, CHavg is the chromatic average variance in the horizontal-direction, CVavg is the chromatic average variance in the vertical-direction, and v1, v2, v3, v4 are predefined parameters.

As can be seen from the above, the horizontal chromatic variance CHavg is obtained by setting the pixel R33 as a center and calculating a chromatic variance of pixels G32 and R33, a chromatic variance of pixels G32 and R31, a chromatic variance of pixels G34 and R33, and a chromatic variance of pixels G34 and R35, and giving different weights according to space positions of the horizontal-direction pixels relative to the center pixel R33. Finally, the horizontal chromatic average variance CHavg can be obtained by summing and taking average value of all the horizontal detail variances of the different positions with different weightings. By the same token, the vertical chromatic average variance CVavg can be obtained by summing and taking average value of all the vertical detail variances of the different positions with different weightings.

Then, if determining the horizontal chromatic average variance CHavg minus the vertical chromatic average variance CVavg is greater than the chromatic threshold CT, the interpolation determination unit 108 performs interpolation on the pixel R33 of the luminance information LI with the vertical color information estimate Ev, to reestablish the green color information G33; if determining the vertical chromatic average variance CVavg minus the horizontal chromatic average variance CHavg is greater than the chromatic threshold CT, the interpolation determination unit 108 performs interpolation on the pixel R33 of the luminance information LI with the horizontal color information estimate Eh, to reestablish the green color information G33; if determining both the horizontal chromatic average variance CHavg minus the vertical chromatic average variance CVavg and the vertical chromatic average variance CVavg minus the horizontal chromatic average variance CHavg are smaller than the chromatic threshold CT, the interpolation determination unit 108 determines the pixel R33 is located on a flat area and performs interpolation on the pixel R33 of the luminance information LI with the directionless color information estimate En, to reestablish the green color information G33.

The horizontal color information estimate Eh is a sum of a horizontal mean of first horizontal-direction pixels of the pixel R33 of the luminance information LI which have the same color information (green) with the desired interpolation color information and the horizontal variance of second horizontal-direction pixels of the pixel R33 of the luminance information LI which have different color information (red and blue) with the desired interpolation color information. The vertical color information estimate Ev is a sum of a vertical mean of first vertical-direction pixels of the pixel R33 of the luminance information LI which have the same color information with the desired interpolation color information and the vertical variance of second vertical-direction pixels of the pixel R33 of the luminance information LI which have different color information with the desired interpolation color information. The directionless color information estimate En is a directionless mean of the pixels in the first horizontal-direction and the pixels in the first vertical-direction of the pixel R33 of the luminance information LI which have the same color information pixel with the desired interpolation color information as follows:

$$Eh=(G32+G34)/2+(p1*R33-R31-R35)/p2$$

$$Ev=(G23+G43)/2+(p1*R33-R13-R53)/p2$$

$$En=(G32+G34+G23+G43)/4$$

wherein p1, p2 are predefined parameters, Eh is the color information estimate in the horizontal-direction, Ev is the color information estimate in the vertical-direction and En is the color information estimate in the directionless.

As can be seen from the above, the horizontal color information estimate Eh is a sum of the mean of pixels G32 and G34 and the variance of pixels R33, R31 and R35, the vertical color information estimate Ev is a sum of the mean of pixels G23 and G43 and the variance of pixels R33, R13 and R53, and the directionless color information estimate En is a mean of pixels G32, G34, G23 and G43.

Noticeably, the spirit of the present invention is to perform determination according to the horizontal detail variance, the vertical detail variance and the chromatic average variance, and then perform interpolation with the proper color information estimate, to enhance determination of the image detail direction. Those skilled in the art may make alterations or modifications accordingly. For example, in the above embodiments, the image processor 10 includes the image contrast adjustment device 102, to increase contrast between pixels having middle illumination and pixels having low illumination of the pixel matrix PX, so as to facilitate determination, but the image processor 10 can also not include the image contrast adjustment device 102 in the practical application, as long as the detail calculation unit 104 and the chromatic calculation unit 106 perform calculation according to the luminance information LI rather than the contrast luminance information CLI; besides, in the above embodiments, when the detail variance can not be utilized for determining whether the horizontal variance or the vertical variance is apparently greater than the other, the chromatic average variances are utilized for determination, but in other embodiments, the interpolation determination unit 108 can perform interpolation with the directionless color information estimate En directly without utilizing the chromatic average variances for determination; moreover, the color information interpolation process 30 calculates the detail variances HDV$_1$~HDV$_3$, VDV$_1$~VDV$_3$ from rough to detail through three stages, to determine whether the horizontal variance or the vertical variance is apparently greater than the other, but the color information interpolation process 30 can also only calculate one or two of all to perform determination in reality, and the calculation method is also not limited to the above formulas, as long as this conceptions are applied.

Figure 6:
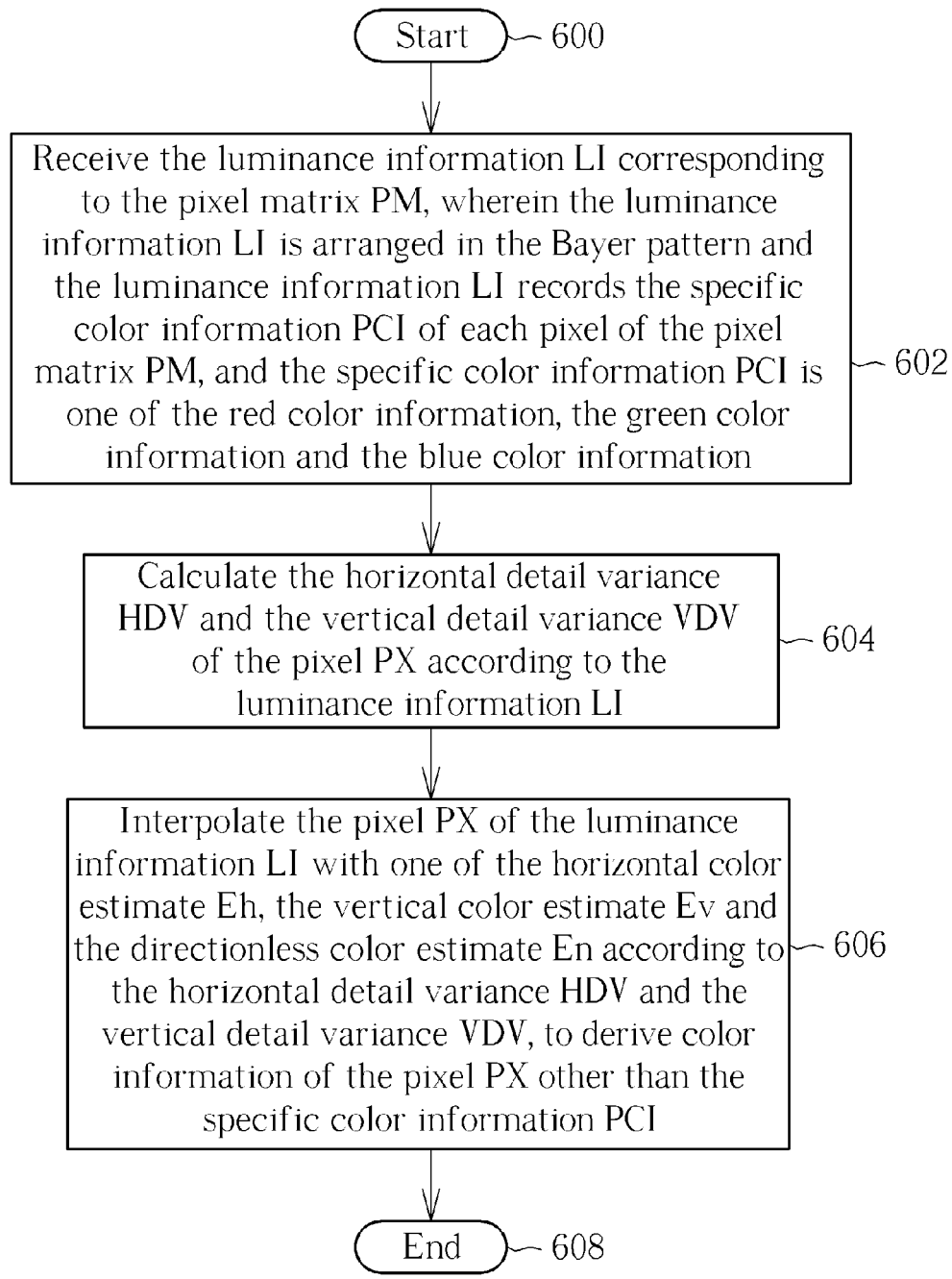
FIG. 6 is a schematic diagram of a color information interpolation process according to another embodiment of the present invention.

Therefore, the color information interpolation operation of the image processor 10 can be summarized into a color information interpolation process 60, as shown in FIG. 6. The image processor 10 includes following steps:

Step 600: Start.

Step 602: Receive the luminance information LI corresponding to the pixel matrix PM, wherein the luminance information LI is arranged in the Bayer pattern and the luminance information LI records the specific color information PCI of each pixel of the pixel matrix PM, and the specific color information PCI is one of the red color information, the green color information and the blue color information.

Step 604: Calculate the horizontal detail variance HDV and the vertical detail variance VDV of the pixel PX according to the luminance information LI.

Step 606: Interpolate the pixel PX of the luminance information LI with one of the horizontal color estimate Eh, the vertical color estimate Ev and the directionless color estimate En according to the horizontal detail variance HDV and the vertical detail variance VDV, to derive color information of the pixel PX other than the specific color information PCI.

Step 608: End

Details of the color information interpolation process 60 can be derived by referring to the above related operations of the image processor 10, and are not narrated hereinafter.

In the prior art, the interpolation method mainly utilizes one of the bilinear interpolation, the boundary interpolation and the minimum chromatic decision interpolation, causing blurred images or the low accuracy of the direction determination in the high frequency image area. In comparison, the present invention performs determination according to the horizontal detail variance, the vertical detail variance and the chromatic average variance, and then performs interpolation with the proper color information estimate, to enhance determination of the image detail direction. Besides, the present invention can further perform the image contrast adjustment, to increase contrast between pixels having middle illumination and pixels having low illumination of the pixel matrix PX, and then calculate the horizontal detail variance, the vertical detail variance and the chromatic average variance, to enhance determination of the image detail direction of the pixels having middle illumination and the pixels having low illumination.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A color information interpolation method for an image processor, comprising:

receiving a luminance information corresponding to a pixel matrix from an image detector by the image processor, wherein the luminance information is arranged in a Bayer pattern and records a specific color information of each pixel of the pixel matrix, and the specific color information is one of a red color information, a green color information and a blue color information;

calculating a horizontal detail variance and a vertical detail variance of a pixel according to the luminance information by a detail calculation unit of the image processor; and interpolating the pixel of the luminance information with one of a horizontal color information estimate, a vertical color information estimate and a directionless color information estimate according to the horizontal detail variance and the vertical detail variance by an interpolation determination unit of the image processor, to derive color information of the pixel other than the specific color information;

wherein the step of calculating the horizontal detail variance and the vertical detail variance according to the luminance information by the detail calculation unit of the image processor comprises:

calculating a first horizontal detail variance and a first vertical detail variance of the pixel according to the pixel and all pixels around the pixel of the luminance information by the detail calculation unit of the image processor; and calculating a second horizontal detail variance and a second vertical detail variance of the pixel according to the pixel and other pixels around the pixel of the luminance information which have a same color information as a desired interpolation color information by the detail calculation unit of the image processor when both the first horizontal detail variance minus the first vertical detail variance and the first vertical detail variance minus the first horizontal detail variance are smaller than a first detail threshold.

2. The color information interpolation method of claim 1, wherein the step of interpolating the pixel of the luminance information with the one of the horizontal color information estimate, the vertical color information estimate and the directionless color information estimate according to the horizontal detail variance and the vertical detail variance by the interpolation determination unit of the image processor comprises:

interpolating the pixel of the luminance information with the vertical color information estimate or the horizontal color information estimate by the interpolation determination unit of the image processor when the horizontal detail variance minus the vertical detail variance or the vertical detail variance minus the horizontal detail variance is greater than a detail threshold, respectively.

3. The color information interpolation method of claim 1, wherein the step of interpolating the pixel of the luminance information with the one of the horizontal color information estimate, the vertical color information estimate and the directionless color information estimate according to the horizontal detail variance and the vertical detail variance by the interpolation determination unit of the image processor comprises:

calculating a horizontal chromatic mean variance and a vertical chromatic mean variance of the pixel according to the pixel and vertical-direction pixels and horizontal-direction pixels of the pixel of the luminance information by a chromatic calculation unit of the image processor when both the horizontal detail variance minus the vertical detail variance and the vertical detail variance minus the horizontal detail variance are smaller than a detail threshold, and interpolating the pixel of the luminance information with one of the horizontal color information estimate, the vertical color information estimate and the directionless color information estimate according to the horizontal chromatic mean variance and the vertical chromatic mean variance by the interpolation determination unit of the image processor, to derive color information of the pixel other than the specific color information.

4. The color information interpolation method of claim 1, wherein the step of calculating the horizontal detail variance and the vertical detail variance according to the luminance information by the detail calculation unit of the image processor comprises:

performing image contrast adjustment on the luminance information, to generate a contrast adjustment luminance information by an image contrast adjustment device of the image processor, and calculating the horizontal detail variance and the vertical detail variance of the pixel according to the contrast adjustment luminance information by the detail calculation unit of the image processor.

5. The color information interpolation method of claim 1, wherein the step of interpolating the pixel of the luminance information with the one of the horizontal color information estimate, the vertical color information estimate and the directionless color information estimate according to the horizontal detail variance and the vertical detail variance by the interpolation determination unit of the image processor comprises:

interpolating the pixel of the luminance information with the vertical color information estimate or the horizontal color information estimate by the interpolation determination unit of the image processor when the first horizontal detail variance minus the first vertical detail variance or the first vertical detail variance minus the first horizontal detail variance is greater than a first detail threshold, respectively.

6. The color information interpolation method of claim 1, wherein the step of interpolating the pixel of the luminance information with the one of the horizontal color information estimate, the vertical color information estimate and the directionless color information estimate according to the horizontal detail variance and the vertical detail variance by the interpolation determination unit of the image processor comprises:

interpolating the pixel of the luminance information with the vertical color information estimate or the horizontal color information estimate by the interpolation determination unit of the image processor when the second horizontal detail variance minus the second vertical detail variance or the second vertical detail variance minus the second horizontal detail variance is greater than a second detail threshold, respectively.

7. The color information interpolation method of claim 1, wherein the step of calculating the horizontal detail variance and the vertical detail variance according to the luminance information by the detail calculation unit of the image processor comprises:

calculating a third horizontal detail variance and a third vertical detail variance of the pixel according to the pixel and other pixels around the pixel of the luminance information which have different color information with the desired interpolation color information by the detail calculation unit of the image processor when both the second horizontal detail variance minus the second vertical detail variance and the second vertical detail variance minus the second horizontal detail variance are smaller than a second detail threshold.

8. The color information interpolation method of claim 1, wherein the horizontal color information estimate is a sum of a horizontal mean of first horizontal-direction pixels of the pixel of the luminance information which have a same color information with a desired interpolation color information and a horizontal variance of second horizontal-direction pixels of the pixel of the luminance information which have different color information with the desired interpolation color information, the vertical color information estimate is a sum of a vertical mean of first vertical-direction pixels of the pixel of the luminance information which have the same color information with the desired interpolation color information and a vertical variance of second vertical-direction pixels of the pixel of the luminance information which have different color information with the desired interpolation color information, and the directionless color information estimate is a directionless mean of the first horizontal-direction pixels and the first vertical-direction pixels of the pixel of the luminance information which have the same color information pixel with the desired interpolation color information.

* * * * *